United States Patent
Yamauchi et al.

(10) Patent No.: US 8,790,846 B2
(45) Date of Patent: Jul. 29, 2014

(54) GAS DIFFUSION LAYER AND PROCESS FOR PRODUCTION THEREOF, AND FUEL CELL

(75) Inventors: Masaki Yamauchi, Osaka (JP); Yoichiro Tsuji, Osaka (JP)

(73) Assignee: Panasonic Corporation, Osaka (JP)

( * ) Notice: Subject to any disclaimer, the term of this patent is extended or adjusted under 35 U.S.C. 154(b) by 636 days.

(21) Appl. No.: 13/139,022

(22) PCT Filed: Jul. 2, 2010

(86) PCT No.: PCT/JP2010/004350
§ 371 (c)(1),
(2), (4) Date: Jun. 10, 2011

(87) PCT Pub. No.: WO2011/030489
PCT Pub. Date: Mar. 17, 2011

(65) Prior Publication Data
US 2011/0244358 A1    Oct. 6, 2011

(30) Foreign Application Priority Data

Sep. 10, 2009 (JP) ................. 2009-209033

(51) Int. Cl.
*H01M 4/36* (2006.01)
*H01M 8/10* (2006.01)
*H01M 8/04* (2006.01)
*H01M 8/02* (2006.01)

(52) U.S. Cl.
CPC .......... *H01M 8/0234* (2013.01); *H01M 8/0245* (2013.01); *H01M 8/0239* (2013.01); *Y02E 60/521* (2013.01); *H01M 2250/20* (2013.01); *H01M 8/1002* (2013.01); *Y02T 90/32* (2013.01)
USPC ............ 429/530; 419/481; 419/480; 419/514

(58) Field of Classification Search
CPC ............ H01M 8/0234; H01M 8/0245; H01M 8/0239; H01M 8/1002
USPC .................. 429/530, 481, 514, 480
See application file for complete search history.

(56) References Cited

U.S. PATENT DOCUMENTS

| | | |
|---|---|---|
| 2002/0090543 A1 | 7/2002 | Okamoto |
| 2005/0173244 A1 | 8/2005 | Hayashi et al. |

(Continued)

FOREIGN PATENT DOCUMENTS

| | | |
|---|---|---|
| CN | 101034746 | 9/2007 |
| JP | 52-97133 | 8/1977 |

(Continued)

OTHER PUBLICATIONS

International Search Report issued Oct. 12, 2010 in International (PCT) Application No. PCT/JP2010/004350.

(Continued)

*Primary Examiner* — Helen O Conley
(74) *Attorney, Agent, or Firm* — Wenderoth, Lind & Ponack, LLP.

(57) ABSTRACT

An object of the present invention is to provide a gas diffusion layer having gas flow passages formed at its one main surface, which is capable of achieving a further improvement in power generation performance. The fuel cell-use gas diffusion layer (14A, 14C) of the present invention has a double-layer structure made up of a first diffusion layer (15A, 15C) having gas flow passages (21A, 21C) at its one main surface, and a second diffusion layer (16A, 16C) disposed on the other main surface of the first diffusion layer. The first diffusion layer and the second diffusion layer are each structured with a porous member mainly comprised of conductive particles and a polymer resin, and the first diffusion layer is structured to be lower in porosity than the second diffusion layer.

10 Claims, 6 Drawing Sheets

(56) References Cited

U.S. PATENT DOCUMENTS

| | | |
|---|---|---|
| 2008/0299430 A1 | 12/2008 | Ichikawa et al. |
| 2010/0003400 A1 | 1/2010 | Tanuma |

FOREIGN PATENT DOCUMENTS

| | | |
|---|---|---|
| JP | 57-30270 | 2/1982 |
| JP | 2-226663 | 9/1990 |
| JP | 2000-123850 | 4/2000 |
| JP | 2002-164056 | 6/2002 |
| JP | 2003-187809 | 7/2003 |
| JP | 2005-294121 | 10/2005 |
| JP | 2005-302675 | 10/2005 |
| JP | 2006-4879 | 1/2006 |
| JP | 2006-172871 | 6/2006 |
| JP | 2006-286494 | 10/2006 |
| JP | 2006-339089 | 12/2006 |
| WO | 2008/093802 | 8/2008 |

OTHER PUBLICATIONS

International Preliminary Report on Patentability issued Apr. 19, 2012 in International (PCT) Application No. PCT/JP2010/004350, together with English translation thereof.

Chinese Office Action (OA) issued Nov. 5, 2013 in Chinese Patent Application No. 201080003671.3, together with English translation thereof.

Chinese Search Report (SR) issued Nov. 5, 2013 in Chinese Patent Application No. 201080003671.3, together with English translation thereof.

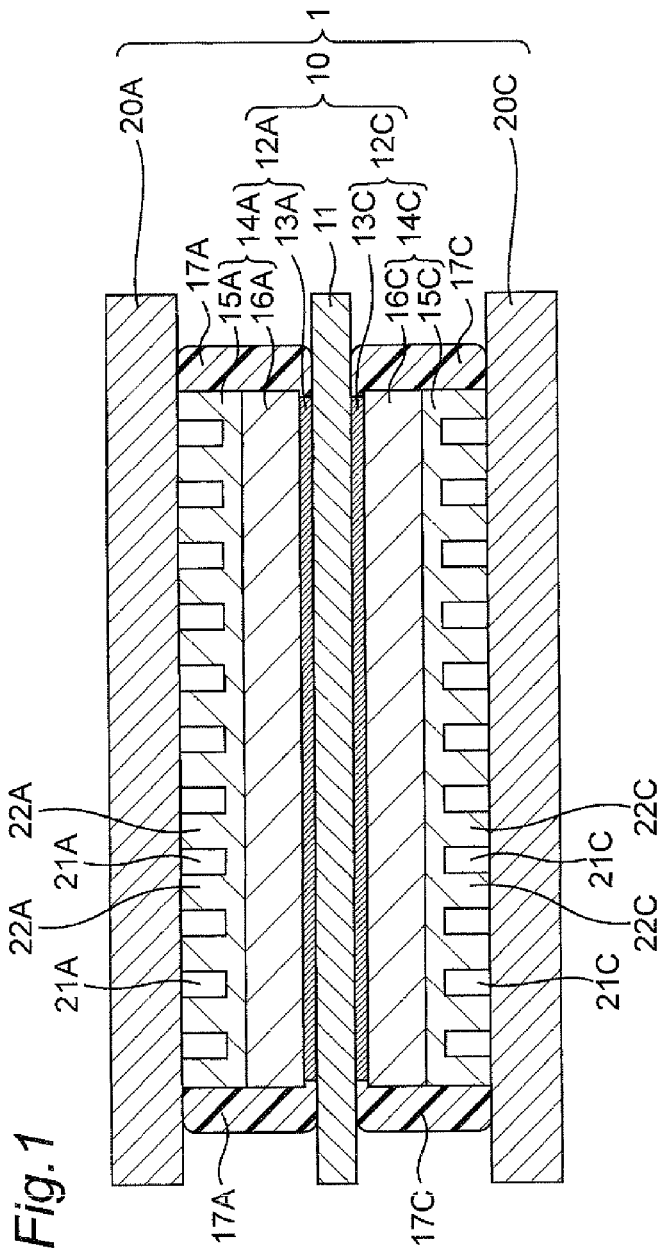
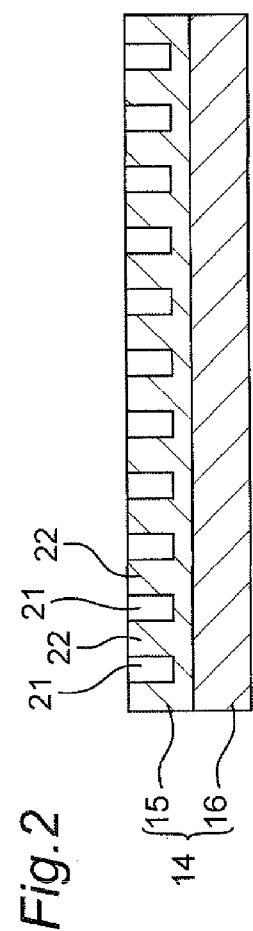
Fig.1
Fig.2

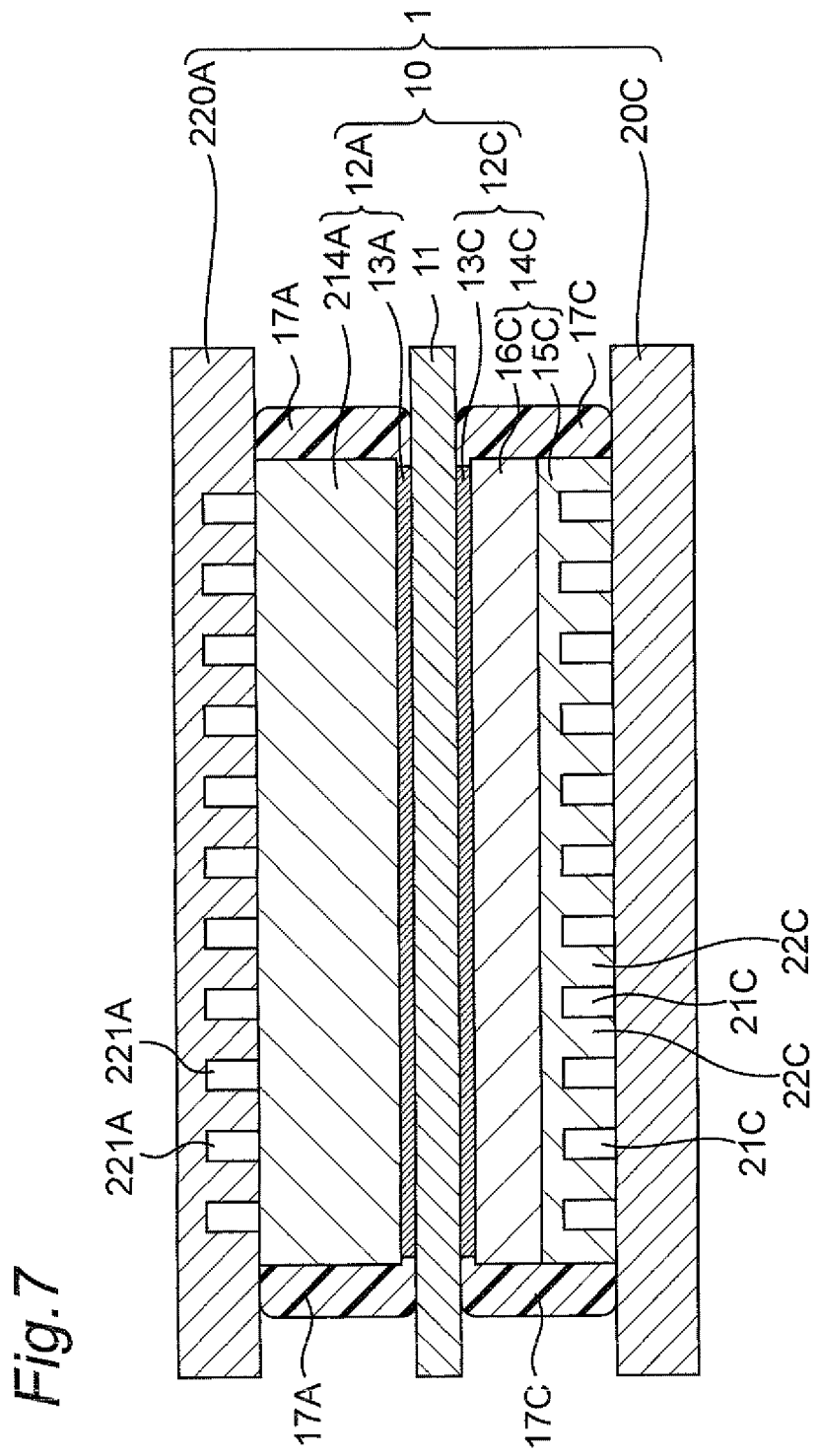

GAS DIFFUSION LAYER AND PROCESS FOR PRODUCTION THEREOF, AND FUEL CELL

TECHNICAL FIELD

The present invention relates to a fuel cell that uses a liquid fuel such as pure hydrogen, methanol or the like, or a reducing agent such as reformed hydrogen obtained from a fossil fuel as a fuel gas, and that uses air (oxygen) as an oxidant gas. More specifically, the present invention relates to a gas diffusion layer included in the fuel cell and a process for production thereof.

BACKGROUND ART

A fuel cell, for example a polymer electrolyte fuel cell, is an apparatus that allows a fuel gas containing hydrogen and an oxidant gas containing oxygen such as air to electrochemically react with each other at a gas diffusion layer that has a catalyst layer such as platinum, such that electric power and heat are produced at the same time.

FIG. 8 is a schematic diagram showing the basic structure of a conventional polymer electrolyte fuel cell. A single cell (also referred to as a cell) 100 of the polymer electrolyte fuel cell includes a membrane electrode assembly 110 (hereinafter referred to as the MEA: Membrane-Electrode-Assembly) and paired plate-like electrically conductive separators 120 disposed on the opposite faces of the MEA 110, respectively.

The MEA 110 includes a polymer electrolyte membrane (a resin ion exchange membrane) 111 that selectively transports hydrogen ions, and paired electrode layers 112 formed at the opposite faces of the polymer electrolyte membrane 111. The paired electrode layers 112 are formed at the opposite faces of the polymer electrolyte membrane 111, and each include a catalyst layer 113 which is mainly comprised of carbon powder bearing a platinum metal catalyst, and a gas diffusion layer 114 that is formed on the catalyst layer 113 and that has combined features of current-collecting effect, gas permeability, and water repellency. The gas diffusion layer 114 is structured with a porous base material 115 made of carbon fibers, and a coating layer (a water-repellent carbon layer) 116 made of carbon and a water-repellent member.

The paired separators 120 are provided with, at their main surfaces abutting on the gas diffusion layers 114, respectively, fuel gas flow passages 121 for allowing the fuel gas to flow through, and oxidant gas flow passages 122 for allowing the oxidant gas to flow through. Further, the paired separators 120 are provided with coolant flow channels 123 through which coolant or the like flows through. Supply of the fuel gas and the oxidant gas to the paired electrode layers 112 through the gas flow passages 121 and 122, respectively, causes an electrochemical reaction, to produce electric power and heat.

As shown in FIG. 8, the cell 100 structured as described above is generally used by being stacked by one piece or more, so that the cells 100 adjacent to each other are electrically connected in series. It is noted that, here, the cells 100 stacked together are fastened under pressure at a prescribed fastening pressure by fastening members 130 such as bolts, so as to prevent leakage of the fuel gas and the oxidant gas, which are the reactant gas, and to reduce the contact resistance. Accordingly, each of the MEAs 110 and each of the separators 120 are brought into plane-to-plane contact at a prescribed pressure. Here, the separators 120 have a current collecting ability for electrically connecting adjacent ones of the MEAs 110 and 110 in series. Further, in order to prevent the gases required for the electrochemical reaction from leaking externally, sealing members (gaskets) 117 are disposed between the paired separators 120 and 120 so as to cover the side surfaces of the catalyst layer 113 and the gas diffusion layer 114.

In recent years, in the field of the fuel cell, there is a demand for a further reduction in costs. Accordingly, from the viewpoint of a reduction in the unit price of the constituents and in the number of components, various techniques for achieving a reduction in costs have been proposed. One of such proposals is a technique of providing the gas flow passages at the gas diffusion layer, instead of at the separator.

In the conventional fuel cell shown in FIG. 8, the gas flow passages are provided at each of the separators. A method of implementing such a structure is to use, e.g., carbon and resin, as the material of each separator, and subjecting them to injection molding using a mold having concavity and convexity corresponding to the shape of the gas flow passages. However, in this case, there is an issue of the high production cost. Further, another method of implementing such a structure is to use metal as the material of each separator, and to roll the metal using a mold having concavity and convexity corresponding to the shape of the gas flow passages. However, in this case, though a reduction in cost can be realized as compared to the injection molding, there is an issue that the separator is prone to corrode, which in turn impairs the power generation performance as the fuel cell.

On the other hand, the gas diffusion layer is structured with a porous member, such that it possesses gas diffusibility. Accordingly, it is easier to form the gas flow passages at the gas diffusion layer than forming them at the separator, and is advantageous in reducing the cost and in achieving higher power generation performance. For example, Patent Documents 1 to 3 each disclose a gas diffusion layer having such a structure.

Patent Document 1 discloses the following technique: using a molding jig provided with a plurality of flow channel molds each elongated in a rectangular parallelepiped form, molding a porous member whose base material is carbon fibers by a paper-making method; and thereafter, by removing the molding jig, forming gas flow passages inside the gas diffusion layer.

Patent Document 2 discloses the following technique: patterning partition walls made of resin or metal which are to form the gas flow passages on a separator; and thereafter, shaping a porous member whose base material is carbon fibers so as to cover the partition walls, to form the gas flow passages at a gas diffusion layer.

Patent Document 3 discloses the following technique: disposing a flow channel structuring member made of carbon paper provided with a gas flow passages structure by punching or the like between a porous member whose base material is carbon fibers, and a flat plate-like separator, to form gas flow passages at a gas diffusion layer.

Further, as disclosed in the aforementioned Patent Documents 1 to 3, the gas diffusion layer is generally structured with a porous member whose base material is carbon fibers. However, the porous member whose base material is carbon fibers involves complicated production steps and requires a considerable production cost, and hence, it is expensive. Accordingly, a technique has been proposed to achieve a reduction in costs of the fuel cell by structuring a gas diffusion layer without using the porous member whose base material is carbon fibers. As the gas diffusion layer of such a structure, for example, Patent Document 4 discloses one.

Patent Document 4 discloses a technique of structuring a gas diffusion layer by mixing graphite, carbon black, uncalcined PTFE (polytetrafluoroethylene), and calcined PTFE, without using carbon fibers as the base material.

PRIOR ART DOCUMENTS

Patent Documents

Patent Document 1: Japanese Unexamined Patent Publication No. 2006-339089
Patent Document 2: Japanese Unexamined Patent Publication No. 2005-294121
Patent Document 3: Japanese Unexamined Patent Publication No. 2000-123850
Patent Document 4: Japanese Unexamined Patent Publication No. 2003-187809

SUMMARY OF THE INVENTION

Subject to be Solved by the Invention

In a case where the gas diffusion layer is structured with a porous member whose base material is carbon fibers, as can be seen in the aforementioned Patent Documents 1 to 3, normally, its porosity exhibits a high value of 80% or more. Accordingly, when the gas flow passages are formed at the gas diffusion layer, the reactant gas may disadvantageously permeate (shortcut) through rib portions that each partition between adjacent ones of the gas flow passages. That is, the fuel gas or the oxidant gas may not flow in accordance with the shape of the gas flow passages from the upstream portion to the downstream portion of the gas flow passages. This may impair the gas diffusibility, which may invite a reduction in power generation performance.

Further, with the structure of Patent Document 2, the partition walls prevent the reactant gas from permeating through the rib portions. However, in a case where the partition walls are formed with resin, the electrical conductivity is impaired, which invites an increase in IR loss. On the other hand, in a case where the partition walls are formed with metal, a side reaction becomes likely to occur, and the durability of the polymer electrolyte membrane reduces. That is, consequently, the power generation performance may be impaired.

On the other hand, as disclosed in Patent Document 4, in a case where the gas diffusion layer is structured without using the carbon fibers as the base material, the porosity can be suppressed to be lower than 80%. Accordingly, it is possible to prevent the reactant gas from permeating through the rib portions. However, a gas diffusion layer structured without using carbon fibers as the base material (hereinafter, such a gas diffusion layer is referred to as the base material-less gas diffusion layer) faces an issue of being low in strength. Accordingly, in a case where the gas flow passages are formed at the base material-less gas diffusion layer by rolling or the like, the rib portions each partitioning adjacent ones of the gas flow passages may deform by, e.g., a pressure being applied to the cell when it is assembled. This may invite an excessive reduction in cross-sectional area of the gas flow passages.

The strength of the base material-less gas diffusion layer can be enhanced by reducing the porosity (i.e., increasing the density). However, in this case, the gas diffusibility is impaired. In particular, the reactant gas cannot reach the catalyst layer vertically below the rib portions, and an in-plane power generation distribution varies, resulting in a voltage drop. That is, consequently, the power generation performance is impaired.

Accordingly, an object of the present invention is to improve the aforementioned issues, and to provide a gas diffusion layer that has gas flow passages formed at one main surface, and that is capable of achieving a further improvement in power generation performance, and to provide a process for production thereof, and a fuel cell including the gas diffusion layer.

Means for Solving the Subject

In order to achieve the aforementioned object, the present invention is provided with the following arrangements.

According to a first aspect of the present invention, there is provided a gas diffusion layer used for fuel cell, wherein
the gas diffusion layer has a double-layer structure made up of a first diffusion layer and a second diffusion layer, the first diffusion layer having a gas flow passage formed at one main surface of the first diffusion layer, and the second diffusion layer being stacked on an other main surface of the first diffusion layer,
the first and second diffusion layers are each structured with a porous member mainly comprised of conductive particles and a polymer resin, and
the first diffusion layer is lower in a porosity than the second diffusion layer.

As used herein, the "porous member mainly comprised of conductive particles and a polymer resin" refers to a porous member having a structure supported by the conductive particles and the polymer resin, without use of carbon fibers as the base material (what is called a self-supporting structure). In a case where a porous member is structured with the conductive particles and the polymer resin, as will be described later, for example, a surfactant and a dispersing solvent are used. In this case, during the course of production, the surfactant and the dispersing solvent are removed by calcination. However, the surfactant and the dispersing solvent may not fully be removed, and may remain in the porous member. Accordingly, so long as it is a self-supporting structure which does not use carbon fibers as the base material, the porous member may contain the remained surfactant and the dispersing solvent. Further, so long as it is a self-supporting structure which does not use carbon fibers as the base material, the porous member may include other materials.

According to a second aspect of the present invention, there is provided the gas diffusion layer according to the first aspect, wherein the first and second diffusion layers are each structured with a porous member mainly comprised of the conductive particles and the polymer resin, with carbon fibers added by a weight smaller than a weight of the polymer resin.

According to a third aspect of the present invention, there is provided the gas diffusion layer according to the second aspect, wherein the carbon fibers are any one of vapor grown carbon fibers, milled fibers, and chopped fibers.

According to a fourth aspect of the present invention, there is provided the gas diffusion layer according to any one of the second and third aspects, wherein the first diffusion layer is higher in a composition ratio of the carbon fibers than the second diffusion layer.

According to a fifth aspect of the present invention, there is provided the gas diffusion layer according to any one of the first to fourth aspects, wherein the conductive particles contained in the first diffusion layer are structured with carbon materials of two types or more differing from each other in an average particle size.

According to a sixth aspect of the present invention, there is provided the gas diffusion layer according to any one of the first to fifth aspects, wherein the first diffusion layer is lower in a composition ratio of the polymer resin than the second diffusion layer.

According to a seventh aspect of the present invention, there is provided the gas diffusion layer according to any one of the first to sixth aspects, wherein the porosity of the first diffusion layer is 20% or more and less than 50%.

According to an eighth aspect of the present invention, there is provided the gas diffusion layer according to any one of the first to seventh aspects, wherein the porosity of the second diffusion layer is 65% or more and less than 80%.

According to a ninth aspect of the present invention, there is provided a fuel cell, comprising:

a polymer electrolyte membrane;

paired catalyst layers opposing to each other having the polymer electrolyte membrane interposed therebetween;

paired gas diffusion layers opposing to each other having the polymer electrolyte membrane and the paired catalyst layers interposed therebetween; and paired collector plates opposing to each other having the polymer electrolyte membrane, the paired catalyst layers, and the paired gas diffusion layers interposed therebetween, wherein at least one of the paired gas diffusion layers is the gas diffusion layer according to any one of the first to eighth aspects, and the first diffusion layer contacts the collector plate, and the second diffusion layer contacts the catalyst layer.

According to an 10th aspect of the present invention, there is provided a fuel cell, comprising:

a polymer electrolyte membrane;

an anode catalyst layer formed on one main surface of the polymer electrolyte membrane;

an anode gas diffusion layer stacked on the anode catalyst layer;

a separator stacked on the anode gas diffusion layer, having a gas flow passage formed at a main surface of the separator that contacts the anode gas diffusion layer;

a cathode catalyst layer formed on an other main surface of the polymer electrolyte membrane;

a cathode gas diffusion layer stacked on the cathode catalyst layer; and a collector plate stacked on the cathode gas diffusion layer, wherein the cathode gas diffusion layer is the gas diffusion layer according to any one of the first to eighth aspects, and the first diffusion layer contacts the collector plate, and the second diffusion layer contacts the catalyst layer.

According to an 11th aspect of the present invention, there is provided a process for production of a gas diffusion layer used for a fuel cell, comprising:

preparing two sheet-like porous members differing from each other in a porosity;

of the prepared two porous members, disposing a porous member whose porosity is lower in a mold having a projection portion corresponding to a shape of a gas flow passage, and thereafter, performing rolling so as to form the gas flow passage at one main surface of the porous member whose porosity is lower; and stacking and bonding a porous member whose porosity is higher on an other main surface of the porous member whose porosity is lower and having the gas flow passage formed.

According to a 12th aspect of the present invention, there is provided a process for production of a gas diffusion layer used for a fuel cell, comprising:

preparing two sheet-like porous members differing from each other in a porosity;

stacking the prepared two porous members; and disposing the stacked two porous members in a mold having a projection portion corresponding to a shape of a gas flow passage, such that a porous member whose porosity is lower faces the projection portion, and thereafter, performing rolling so as to form the gas flow passage at one main surface of the porous member whose porosity is lower.

Effects of the Invention

In connection with the fuel cell-use gas diffusion layer of the present invention, the gas diffusion layer has a double-layer structure made up of the first diffusion layer and the second diffusion layer. The first diffusion layer having gas flow passages formed is set to be lower in porosity than the second diffusion layer. That is, the strength of the first diffusion layer is set to be higher than that of the second diffusion layer. This makes it possible to prevent the rib portions each partitioning adjacent ones of the gas flow passages from deforming by a pressure applied, e.g., when a plurality of cells are stacked and fastened under pressure, which may otherwise invite closure of the gas flow passages. Further, it is possible to prevent the reactant gas from permeating through the rib portions, and to allow the reactant gas to flow at a constant flow rate from the upstream portion to the downstream portion of the gas flow passages in accordance with the shape of the gas flow passages. Further, because the second diffusion layer is higher in porosity than the first diffusion layer, the gas diffusibility of the second diffusion layer allows the reactant gas to diffuse vertically below the rib portions also, which in turn suppresses variations in the in-plane power generation distribution.

Accordingly, a further improvement in power generation performance can be achieved. Further, the first and second diffusion layers are each structured with a porous member mainly comprised of conductive particles and a polymer resin, a reduction in costs can be achieved, and the gas flow passages of a complicated shape can be formed with ease.

BRIEF DESCRIPTION OF THE DRAWINGS

These and other objects and features of the present invention will become clear from the following description taken in conjunction with the preferred embodiments thereof with reference to the accompanying drawings, in which:

FIG. 1 is a schematic cross-sectional view showing the basic structure of a fuel cell according to an embodiment of the present invention;

FIG. 2 is a schematic cross-sectional view showing the structure of a gas diffusion layer alone according to the embodiment of the present invention;

FIG. 7 is a schematic cross-sectional view showing a variation of the basic structure of the fuel cell according to the embodiment of the present invention.

MODE FOR CARRYING OUT THE INVENTION

Figure 3:
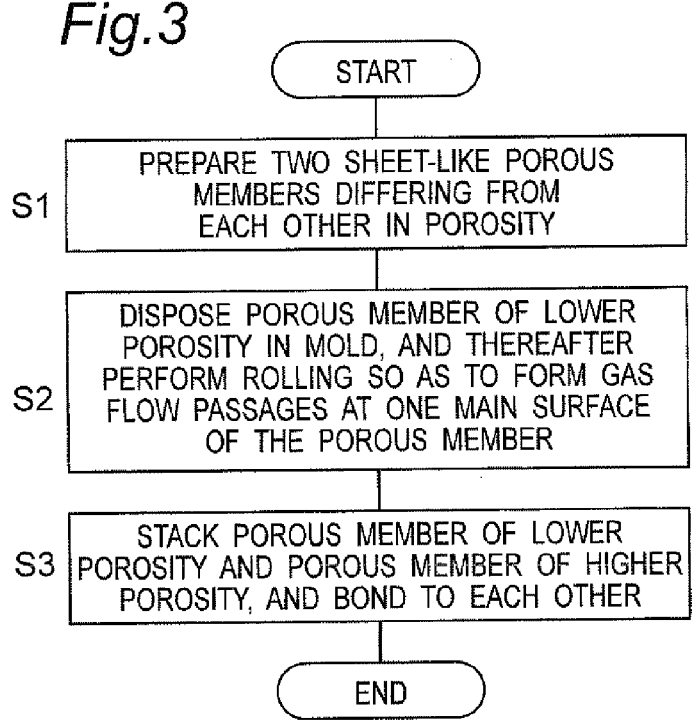
FIG. 3 is a flowchart showing a process for production of the gas diffusion layer according to the embodiment of the present invention.

In the following, with reference to the drawings, a description will be given of an embodiment of the present invention. It is noted that, throughout the drawings referred to in the following, identical reference symbols are allotted to identical or corresponding parts, and description thereof will not be repeated.

<<Embodiment>>

FIG. 1 is a schematic cross-sectional view showing the basic structure of a fuel cell according to the embodiment of the present invention. The fuel cell according to the present embodiment is a polymer electrolyte fuel cell that allows a fuel gas containing hydrogen and an oxidant gas containing oxygen such as air to electrochemically react with each other, such that electric power and heat are generated at the same time. It is noted that the present invention is not limited to the polymer electrolyte fuel cell, and is applicable to various fuel cells.

In FIG. 1, the fuel cell according to the present embodiment includes a cell (single cell) 1 that includes a membrane electrode assembly 10 (hereinafter referred to as the MEA), and paired flat plate-like collector plates 20A and 20C possessing electrical conductivity and disposed on opposite faces of the MEA 10, respectively. It is noted that the fuel cell according to the present embodiment may be structured by stacking a plurality of pieces of the cells 1. In this case, the cells 1 stacked together are preferably fastened under pressure at a prescribed fastening pressure by fastening members (not shown) such as bolts, so as to prevent leakage of the fuel gas and the oxidant gas and to reduce the contact resistance.

The MEA 10 includes a polymer electrolyte membrane 11 that selectively transports hydrogen ions, and paired electrode layers formed on opposite faces of the polymer electrolyte membrane 11, respectively. One of the paired electrode layers is an anode electrode (also referred to as the fuel electrode) 12A, and the other is a cathode electrode (also referred to as the air electrode) 12C. The anode electrode 12A is formed on one face of the polymer electrolyte membrane 11, and includes an anode catalyst layers 13A mainly comprised of carbon powder bearing a platinum metal catalyst, and an anode gas diffusion layer 14A that is formed on the anode catalyst layer 13A and that has combined features of current-collecting effect, gas permeability, and water repellency. The cathode electrode 12C is formed on the other face of the polymer electrolyte membrane 11, and includes an cathode catalyst layers 13C mainly comprised of carbon powder bearing a platinum metal catalyst, and a cathode gas diffusion layer 14C that is formed on the cathode catalyst layer 13C and that has combined features of current-collecting effect, gas permeability, and water repellency.

The anode gas diffusion layer 14A is structured with a double-layer structure made up of a first anode diffusion layer 15A which is one example of a first diffusion layer, and a second anode diffusion layer 16A which is one example of a second diffusion layer. The first and second anode diffusion layers 15A and 16A are each structured with a base material-less gas diffusion layer in which carbon fibers are not used as the base material. Specifically, the first and second anode diffusion layers 15A and 16A are each structured with a porous member mainly comprised of conductive particles and a polymer resin. The first anode diffusion layer 15A is provided with, at its one main surface, fuel gas flow passages 21A for allowing the fuel gas to flow through. The tip of each rib portion 22A partitioning adjacent ones of the fuel gas flow passages 21A and 21A is brought into contact with the collector plate 20A at a prescribed pressure. This prevents the fuel gas from leaking outside the fuel gas flow passages 21A (external leakage). The other main surface of the first anode diffusion layer 15A contacts the second anode diffusion layer 16A. The first anode diffusion layer 15A is structured to be lower in porosity than the second anode diffusion layer 16A. The second anode diffusion layer 16A contacts the anode catalyst layer 13A.

The cathode gas diffusion layer 14C is structured with a double-layer structure made up of a first cathode diffusion layer 15C which is one example of a first diffusion layer, and a second cathode diffusion layer 16C which is one example of a second diffusion layer. The first and second cathode diffusion layers 15C and 16C are each structured with the base material-less gas diffusion layer in which carbon fibers are not used as the base material. Specifically, the first and second cathode diffusion layers 15C and 16C are each structured with a porous member mainly comprised of conductive particles and a polymer resin. The first cathode diffusion layer 15C is provided with, at its one main surface, oxidant gas flow passages 21C for allowing the oxidant gas to flow through. The tip of each rib portion 22C partitioning adjacent ones of oxidant gas flow passages 21C and 21C is brought into contact with the collector plate 20C at a prescribed pressure. This prevents the oxidant gas from leaking outside the oxidant gas flow passage 21C (external leakage). The other main surface of the first cathode diffusion layer 15C contacts the second cathode diffusion layer 16C. The first cathode diffusion layer 15C is structured to be lower in porosity than the second cathode diffusion layer 16C. The second cathode diffusion layer 16C contacts the cathode catalyst layer 13C.

Supply of the fuel gas to the anode electrode 12A through the fuel gas flow passage 21A and supply of the oxidant gas to the cathode electrode 12C through the oxidant gas flow passage 21C cause an electrochemical reaction, to produce electric power and heat.

It is noted that, when the cell 1 is fastened under pressure by fastening members (not shown) such as bolts in order to prevent leakage of the reactant gas and to reduce a contact resistance, it is preferable that the fastening pressure is 2 to 10 kgf/cm$^2$. In a case where the fastening pressure is greater than 10 kgf/cm$^2$, the rib portions 22A and 22C are prone to deform. On the other hand, in a case where the fastening pressure is smaller than 2 kgf/cm$^2$, a contact resistance between the members sharply rises, or the fuel gas or the oxidant gas would not easily flow through the fuel gas flow passages 21A or the oxidant gas flow passages 21C.

The collector plates 20A and 20C are structured with a material such as metal possessing low gas permeability. Preferably, the collector plates 20A and 20C are structured with a material such as carbon, metal or the like which possesses excellent corrosion resistance, electrical conductivity, gas impermeability, and flatness. It is noted that, coolant flow channels (not shown) for allowing coolant or the like to flow through may be provided at the collector plates 20A and 20C.

In order to prevent leakage of the fuel gas to the outside, anode gaskets 17A are provided as sealing members between the collector plate 20A and the polymer electrolyte membrane 11, so as to cover the side surfaces of the anode catalyst layer 13A and the anode gas diffusion layer 14A. Further, in order to prevent leakage of the oxidant gas to the outside, cathode gaskets 17C are provided as sealing members between the collector plate 20C and the polymer electrolyte membrane 11, so as to cover the side surfaces of the cathode catalyst layer 13C and the cathode gas diffusion layer 14C.

As the material of the anode gaskets 17A and the cathode gaskets 17C, general thermoplastic resin, thermosetting resin or the like can be used. For example, as the material of the anode gaskets 17A and the cathode gaskets 17C, silicone resin, epoxy resin, melamine resin, polyurethane based resin, polyimide based resin, acrylic resin, ABS resin, polypropylene, liquid crystal polymer, polyphenylene sulfide resin, polysulfone, glass fiber reinforced resin or the like can be used.

It is noted that, the anode gaskets 17A and the cathode gaskets 17C are preferably partially impregnated with the circumferential portion of the anode gas diffusion layer 14A or the cathode gas diffusion layer 14C. This makes it possible to improve the power generation durability and the strength.

Further, instead of the anode gaskets 17A and the cathode gaskets 17C, gaskets may be disposed between the collector plate 20A and the collector plate 20C, so as to cover the side surfaces of the polymer electrolyte membrane 11, the anode electrode 12A, and the cathode electrode 12C. This makes it possible to prevent degradation of the polymer electrolyte membrane 11, and to improve the handleability of the MEA 10 and the workability in mass production.

Next, a further detailed description will be given of the structure of the anode gas diffusion layer 14A and the cathode gas diffusion layer 14C according to the present embodiment. Here, unless otherwise noted, the anode gas diffusion layer 14A and the cathode gas diffusion layer 14C are identically structured. Therefore, when a description is given to any matter common to them, they are simply referred to as the gas diffusion layer 14. Further, the first anode diffusion layer 15A and the first cathode diffusion layer 15C are referred to as the first diffusion layer 15; and the second anode diffusion layer 16A and the second cathode diffusion layer 16C is referred to as the second diffusion layer 16. Further, the fuel gas flow passages 21A and the oxidant gas flow passages 21C are referred to the gas flow passages 21; and the rib portions 22A and 22C are referred to as the rib portion 22. FIG. 2 is a schematic cross-sectional view showing the structure of a gas diffusion layer alone.

The gas diffusion layer 14 has the following three functions. The first one is a gas diffusing function of allowing the reactant gas flowing from the gas flow passages 21 to diffuse into not only vertically below the gas flow passages 21, but also vertically below the rib portions 22. The second one is a water managing function of discharging excessive water while appropriately moistening inside the catalyst layer. The third one is a current collecting function of forming an electron transfer path.

The gas diffusion layer 14 is structured with a two-layer structure made up of the first diffusion layer 15 and the second diffusion layer 16. The first and second diffusion layers 15 and 16 are each structured with a sheet-like and rubber-like porous member mainly comprised of conductive particles and a polymer resin. The porosity of the first diffusion layer 15 is set to be lower than that of the second diffusion layer 16. As will be described later, the porosity of the first and second diffusion layers 15 and 16 can be changed by varying the composition of the materials employed, rolling force which is applied during production, number of times of performing rolling and the like.

Preferably, the porosity of the first diffusion layer 15 is 20% or more and less than 50%. In a case where the porosity of the first diffusion layer 15 is less than 20%, the gas permeability reduces. This prevents the reactant gas from arriving not only at vertically below the rib portions 22, but also at vertically below the gas flow passages 21, resulting in a significant reduction in power generation performance. On the other hand, in a case where the porosity of the first diffusion layer 15 is 50% or more, it invites a reduction in strength and the rib portions 22 become prone to deform.

Preferably, the porosity of the second diffusion layer 16 is 65% or more and less than 80%. In a case where the porosity of the second diffusion layer 16 is less than 65%, the gas permeability reduces. This hinders the reactant gas to flow through in the thickness direction, whereby the power generation vertically below the rib portions 22 becomes difficult. On the other hand, it is difficult to achieve a porosity of the gas diffusion layer of 80% or more without using carbon fibers as the base material, from the viewpoint of the production process. Even if it is possible to produce a gas diffusion layer whose porosity is 80% or more, the strength significantly reduces, and it is incapable of exhibiting the function of the gas diffusion layer.

Examples of materials of the conductive particles structuring the first and second diffusion layers 15 and 16 include carbon materials such as graphite, carbon black, activated carbon and the like. The carbon black may be acetylene black (AB), furnace black, Ketjen black, Vulcan and the like. Of these materials, use of acetylene black as the principal component of carbon black is preferable from the viewpoint of small impurity content and high electrical conductivity. Further, an exemplary principal component of graphite may include natural graphite, artificial graphite and the like. Of these materials, use of artificial graphite as the principal component of graphite is preferable from the viewpoint of small impurity amount. Further, an exemplary material form of the carbon material may include powder, fibrous, particulate and the like. Of these, it is preferable to adopt the powder form as the material form of the carbon material, from the viewpoint of dispersibility and handleability.

Preferably, the conductive particles contained in the first diffusion layer 15 are structured with a mixture of carbon materials of two types differing in average particle size. This allows particles of small average particle size to enter the space between particles of great average particle size. Therefore, it becomes easier to reduce the porosity of the entire first diffusion layer 15 (e.g., 60% or less). In a case where acetylene black is used as one carbon material, the other carbon material which facilitates preparation of a filled structure may be artificial graphite. It is noted that, the average particle size $D_{50}$ (the particle size when the relative particle amount is 50%: also referred to as the median diameter) of acetylene black is $D_{50}=5$ µm, and the average particle size $D_{50}$ of artificial graphite is $D_{50}=15$ to 20 µm (measurements obtained by using a laser diffraction type particle size analyzer microtrac HRA).

It is noted that, in a case where the conductive particles is structured with a mixture of carbon materials of three or more types also, it is easy to structure a filled structure. However, in this case, handling (optimization) of the material such as dispersion, mixing, and rolling conditions becomes complicated. More preferably, the conductive particles are structured with a mixture of carbon materials of two types.

Further, in a case where the conductive particles are structured with a mixture of acetylene black and artificial graphite, preferably, the mix ratio (the ratio by weight) between acetylene black and artificial graphite is 1 to 0.3 or more. Setting the mix ratio of artificial graphite to 0.3 or more, the porosity can effectively be reduced.

Being converse to the first diffusion layer 15, the second diffusion layer 16 must be high in porosity. Therefore, preferably, the conductive particles contained in the second diffusion layer 16 are structured with the carbon material of one type. Further, preferably, the carbon material of one type has small variations in particle size. Further, the conductive particles contained in the second diffusion layer 16 may be structured with carbon materials of two types or more differing in average particle size, similarly to the first diffusion layer 15. However, in this case, it is preferable to adjust the mix ratio of the carbon materials, such that the filled structure is not formed. For example, in a case where the conductive particles are structured with a mixture of acetylene black and artificial graphite, preferably, the mix ratio (the ratio by weight) between acetylene black and artificial graphite is 1 to less than 0.3.

The polymer resin structuring the first and second diffusion layers 15 and 16 has a function as a binder for binding the conductive particles to one another. Further, because the polymer resin is water repellent, it also has a function of confining water in the system within the fuel cell (water retentivity). The lower the composition ratio of the polymer resin is, the more hydrophilic the gas diffusion layer itself becomes. High hydrophilicity around the gas flow passages 21 makes it easier to discharge dew condensed water to the outside of the system. Therefore, it is preferable that the first diffusion layer 15 is lower in the polymer resin mix ratio than the second diffusion layer 16. Further, because the polymer resin is not electrically conductive, a reduction in the polymer resin mix ratio of the first diffusion layer 15 makes it possible to reduce the contact resistance between the rib portions 22 and the collector plates 20A and 20C.

Examples of the material of the polymer resin include PTFE (polytetrafluoroethylene), FEP (tetrafluoroethylene-hexafluoropropylene copolymer), PVDF (polyvinylidene fluoride), ETFE (tetrafluoroethylene-ethylene copolymer), PCTFE (polychlorotrifluoroethylene), and PFA (tetrafluoroethylene-perfluoroalkyl vinyl ether copolymer). Of these, use of PTFE as the material of the polymer resin is preferable in the viewpoint of heat resistance, water repellency, and chemical resistance. Examples of material form of PTFE include dispersion, powder and the like. Of these, it is preferable to adopt dispersion as the material form of PTFE, from the viewpoint of workability.

The shape (pattern) of the gas flow passages 21 formed at the first diffusion layer 15 is not particularly limited, and can be formed similarly to the shape of the gas flow passages formed at the conventional separator. Examples of such a shape of the gas flow passages include a straight type, a serpentine type and the like.

Though the optimum value for the width of the gas flow passages 21 largely differs depending on the electrode area, the gas flow rate, the current density, the humidifying condition, the cell temperature and the like, it is preferable that the value falls within a range of 0.1 mm to 3.0 mm, in particular, within a range of 0.2 mm to 1.5 mm. In a case where the width of the gas flow passages 21 is less than 0.1 mm, the width of the gas flow passages 21 may be insufficient for the amount of the reactant gas that normally flows in the fuel cell. On the other hand, in a case where the width of the gas flow passages 21 is greater than 3.0 mm, the reactant gas may not flow through the entire gas flow passages 21, and the reactant gas may accumulate, which may invite flooding.

Though the depth of the gas flow passages 21 largely differs depending on the electrode area, the gas flow rate, the current density, the humidifying condition, the cell temperature and the like, it is preferable that the value falls within a range of 0.015 mm to 2.0 mm, in particular, within a range of 0.03 mm to 0.8 mm. In a case where the depth of the gas flow passages 21 is less than 0.015 mm, the depth of the gas flow passages 21 may be insufficient for the amount of the reactant gas that normally flows in the fuel cell. On the other hand, in a case where the depth of the gas flow passages 21 is greater than 2.0 mm, the reactant gas may not flow through the entire gas flow passages 21, and the reactant gas may accumulate, which may invite flooding.

It is preferable that the width of each rib portion 22 formed at the first diffusion layer 15 falls within a range of 0.1 mm to 3.0 mm, in particular, within a range of 0.2 mm to 2.0 mm.

In a case where the width of each rib portion 22 is less than 0.1 mm, the strength reduces and the gas flow passages 21 become prone to deform. On the other hand, in a case where the width of each rib portion 22 is greater than 2.0 mm, the area vertically below each rib portion 22 becomes great. Therefore, the reactant gas may not evenly diffuse in the first diffusion layer 15, which may invite variations in the in-plane power generation distribution.

Though the optimum value for the thickness of the second diffusion layer 16 largely differs depending on the gas utilization, the current density, the humidifying condition, the cell temperature and the like, it is preferable that the value falls within a range of 0.05 mm to 1.0 mm, in particular, within a range of 0.1 mm to 0.4 mm.

Preferably, the thickness ratio of the second diffusion layer 16 to the first diffusion layer 15 falls within a range of 0.3 to 2.0. In a case where the thickness ratio of the second diffusion layer 16 to the first diffusion layer 15 is less than 0.3, the gas diffusibility in the thickness direction reduces, and the reactant gas will not arrive vertically below each rib portion 22. This causes variations in the in-plane power generation distribution, whereby the power generation performance is impaired. On the other hand, in a case where the thickness ratio of the second diffusion layer 16 to the first diffusion layer 15 is greater than 2.0, the thickness of the entire gas diffusion layer 14 becomes excessively thick. Therefore, the reactant gas will not arrive at the catalyst layers 13A and 13C and the electrical resistance increases, whereby the power generation performance is impaired.

It is noted that the first and second diffusion layers 15 and 16 are each only required to be a structure supported by the conductive particles and the polymer resin, without using carbon fibers as the base material (i.e., a so-called self-supporting structure). Accordingly, the first and second diffusion layers 15 and 16 may contain, in addition to the conductive particles and the polymer resin, a trace quantity of surfactant, dispersing solvent and the like which are used in producing the gas diffusion layer. Examples of the dispersing solvent include water, alcohols such as methanol and ethanol and the like, and glycols such as ethylene glycol and the like. Examples of the surfactant include nonion based surfactant such as polyoxyethylene alkyl ether, and amphoteric ion based surfactant such as alkyl amine oxide. The amount of the dispersing solvent and that of the surfactant used for producing may be set as appropriate in accordance with the type of conductive particles, the type of the polymer resin, the mix ratio between them and the like. It is noted that, generally, a greater amount of the dispersing solvent and that of the surfactant tend to promote uniform dispersion of the conductive particles and the polymer resin. On the other hand, they tend to increase the flowability, making it difficult to have the gas diffusion layer formed as a sheet.

Further, the first and second diffusion layers 15 and 16 may contain carbon fibers of a weight not qualifying as the base material (e.g., by a weight smaller than that of the conductive particles and the polymer resin). Because carbon fibers exhibit a reinforcing effect, it becomes possible to produce a gas diffusion layer of high strength by setting the mix ratio of the carbon fibers to be high. Further, in order to suppress deformation of the rib portions 22, the first diffusion layer 15 requires higher strength than the second diffusion layer 16 does. Therefore, it is preferable that the first diffusion layer 15 is higher in mix ratio of the carbon fibers than the second diffusion layer 16. An increase in the mix ratio of the carbon fibers of the first diffusion layer 15 causes the first diffusion layer 15 highly electrically conductive. Therefore, it also makes it possible to reduce the contact resistance between the rib portions 22 and the collector plates 20A and 20C.

Examples of the material of the carbon fibers include vapor grown carbon fibers (hereinafter, referred to as the VGCFs), milled fibers, cut fibers, chopped fibers and the like. In a case where the VGCFs are used as the carbon fibers, for example, the one whose fiber diameter is 0.15 μm and whose fiber length is 15 μm may be used. Further, in a case where the milled fibers, the cut fibers, or the chopped fibers are used as the carbon fibers, for example, the one whose fiber diameter is 5 to 20 μm, and whose fiber length is 20 μm to 100 μm may be used.

The raw material of the milled fibers, the cut fibers, or the chopped fibers may be any of PAN based, pitch based, and rayon based. Further, the fibers are preferably prepared by cutting and shredding an original fiber (a long fiber filament or a short fiber staple) and used as a bundle of such short fibers being dispersed.

The mix amount of the carbon fibers is preferably of a weight smaller than that of the polymer resin. For the purpose of enhancing the strength of the base material-less gas diffusion layer, mixing of carbon fibers by just a small amount will suffice. When the mix amount of the carbon fibers is increased to be higher than that of the polymer resin, the carbon fibers may penetrate the membrane. Occurrence of such membrane degradation may impair the performance. Further, such an increase causes an increase in costs. Still further, the requirement for the first and second diffusion layers 15 and 16 is not to use the carbon fibers as the base material. Therefore, it may be a self-supporting structure that is supported by the conductive particles, the polymer resin, and the carbon fibers.

Preferably, the porosity of the second anode gas diffusion layer 16A of the anode gas diffusion layer 14A is lower than that of the second cathode gas diffusion layer 16C of the cathode gas diffusion layer 14C. This makes it possible to allow the water retentivity of the second anode gas diffusion layer 16A to be higher than that of the second cathode gas diffusion layer 16C. Further, it makes it possible to allow the gas diffusibility of the second cathode gas diffusion layer 16C to be higher than that of the second anode gas diffusion layer 16A.

Figure 4A:
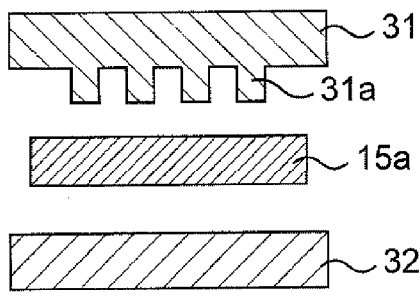
FIG. 4A is a schematic explanatory diagram showing the process for production of the gas diffusion layer according to the embodiment of the present invention.
Figure 4B:
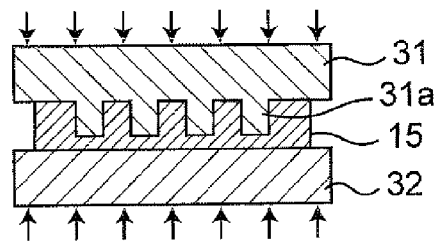
FIG. 4B is a schematic explanatory diagram showing a step following FIG. 4A.
Figure 4C:
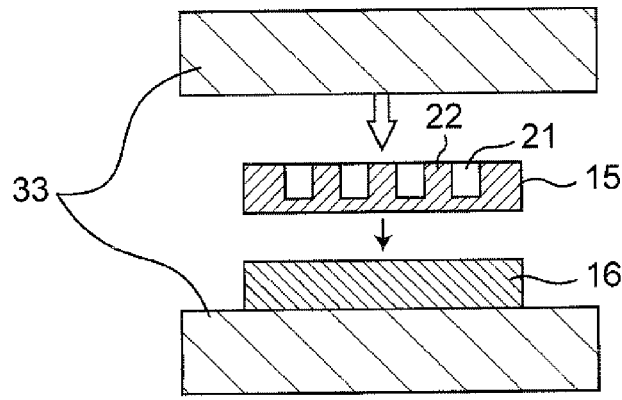
FIG. 4C is a schematic explanatory diagram showing a step following FIG. 4B.

Next, with reference to FIGS. 3, and 4A to 4C, a description will be given of one example of a process for production of the gas diffusion layer 14 according to the embodiment of the present invention. FIG. 3 is a flowchart showing the process for production of the gas diffusion layer according to the embodiment of the present invention. FIGS. 4A to 4C are each a schematic explanatory diagram thereof.

First, in step S1, two sheet-like porous members differing from each other in porosity are prepared.

Each of the sheet-like porous members can be prepared, for example, as follows.

First, the conductive particles, the surfactant, and the dispersing solvent are fed into a mixer and mixed. Thereafter, into the obtained mixture, a polymer resin material is added so as to be dispersed. It is noted that, instead of feeding the carbon material and the polymer resin material separately into the mixer, all the materials can be fed into the mixer at the same time. Subsequently, the mixture obtained by mixing is rolled by a roll press machine or a flat plate press machine to be molded sheet-like. Subsequently, the sheet-like molded mixture is calcined, such that the surfactant and the dispersing solvent are removed from the mixture. Here, preferably, the calcination temperature and the calcination time are the temperature and the time required for the surfactant and the dispersing solvent to vaporize or decompose. Subsequently, the mixture from which the surfactant and the dispersing solvent are removed is re-rolled to have its thickness adjusted. Thus, the sheet-like porous member can be prepared.

The two sheet-like porous members differing from each other in porosity can be produced by changing the conductive particles employed, the rolling force, the number of times of performing rolling by the press machine in the course of preparation steps described above. For example, in a case where the porous member of a high porosity is prepared, a carbon material of one type should be used; in a case where the porous member of a low porosity is prepared, carbon materials of two types differing from each other in average particle size should be used. Thus, two porous members differing from each other in porosity can be obtained. Further, the difference in porosity between the two porous members can be increased by setting a greater rolling force or the greater number of times of performing rolling by the press machine in preparing the porous member of a low porosity, than those in preparing the porous member of a high porosity. Of these two sheet-like porous members prepared as above, the porous member of a low porosity provided with the gas flow passages 21 serves as the first diffusion layer 15, and the porous member of a high porosity serves as the second diffusion layer 16. Here, the porous member before provided with the gas flow passages 21 is referred to as the porous member 15a.

It is noted that, in the foregoing description, though the mixture is rolled by the roll press machine, the flat plate press machine or the like to prepare the sheet-like porous member, the present invention is not limited thereto. For example, the mixture may be fed into an extruder, to be continuously molded sheet-like from the die head of the extruder, to be prepared as the sheet-like porous member. Further, elaborating the screw shape of the extruder to provide the screw with the mixing function, the mixture can be obtained without the necessity of using the mixer. That is, agitation, mixing, sheet molding of the carbon materials can integrally be performed with one machine.

Subsequently, in step S2, as shown in FIGS. 4A and 4B, the porous member of a low porosity 15a is disposed in paired molds 31 and 32 having projection portions 31a corresponding to the shape of the gas flow passages 21. Thereafter, by a rolling machine, the molds 31 and 32 are closed, and rolling is performed. Thus, as shown in FIG. 4C, the gas flow passages 21 are formed at the porous member of a low porosity 15a, and the first diffusion layer 15 can be obtained.

It is noted that, though the molds 31 and 32 may integrally be structured with the rolling machine, it is more handleable when they are structured to be attachable and removable relative to the rolling machine. Further, as the rolling machine, the roll press machine or the flat plate press machine can be used. Of these, use of the roll press machine possessing a high surface precision as the rolling machine is preferable, from the viewpoint of its capability of reducing thickness variations of the first diffusion layer 15. Here, similarly to a general gravure roll machine, it is preferable that the molds 31 and 32 having projection portions 31a are directly formed on the surface of the roll.

Further, when the rolling is performed by the rolling machine, the porous member of a low porosity 15a may be heated as appropriate. In this case, the heating temperature is preferably 250° C. or less. When the heating temperature is 250° C. or less, the porous member of a low porosity 15a softens, facilitating formation of the gas flow passages 21. On the other hand, when the heating temperature is higher than 250° C., the porous member of a low porosity 15a may degrade. Preferably, the rolling force of the rolling machine is less than 500 kgf/cm$^2$. Higher rolling force of the rolling machine facilitates formation of the gas flow passages 21. However, when the porous member of a low porosity 15a is applied with a rolling force of 500 kgf/cm$^2$ or more, it may invite cracking or damage of the material.

Further, in order to prevent the molds 31 and 32 and the porous member of a low porosity 15a from adhering to each other after being subjected to rolling by the rolling machine, a mold release agent may previously be applied. While this mold release agent can be selected as appropriate within a range not affecting the power generation performance of the fuel cell, use of distilled water or surfactant-diluted distilled water is preferable. Further, in place of the mold release agent, a sheet made of PTFE resin may be used. The material of the molds 31 and 32 can be selected out of tool steel such as stainless steel, nickel-chromium-molybdenum steel, cemented carbide steel, SKD11, SKD12, Ni—P hardened chromium and the like, ceramic, glass fiber reinforced plastic, and the like. Further, in order to improve the corrosion resistance and separability, the surface of the molds 31 and 32 may undergo surface-treatment, such as hard Cr plating, PVD coating, TiC coating, TD processing, Zr thermal spraying, PTFE coating or the like. The same holds true for a case where molds 31 and 32 having the projection portions 31a are directly formed on the roll.

Subsequently, in step S3, as shown in FIG. 4C, the first diffusion layer 15 and the second diffusion layer 16 prepared as described above are stacked, and bonded to each other by a flat plate press machine 33. Here, the second diffusion layer 16 is bonded to the main surface of the first diffusion layer 15 which is opposite to the surface where the gas flow passages are formed. Thus, the gas diffusion layer 14 shown in FIG. 2 can be obtained.

As described above, use of the flat plate press machine 33 for bonding the first diffusion layer 15 and the second diffusion layer 16 can prevent the gas diffusion layer 14 from warping in the thickness direction (i.e., from undulating).

It is noted that the bonding performed by the flat plate press machine 33 is preferably carried out at a surface pressure of 2 kg/cm$^2$ or less. In a case where the surface pressure is greater than 2 kg/cm$^2$, the rib portions 22 may deform to narrow the gas flow passages 21.

Further, bonding of the first diffusion layer 15 and the second diffusion layer 16 to each other may be carried out using a conductive adhesive mainly comprised of an conductive filler and a binder. Still further, bonding of the first diffusion layer 15 and the second diffusion layer 16 to each other may be carried out using a dispersion solution (e.g., Nafion: registered trademark, available from DuPont) containing components similar to the polymer electrolyte membrane 11, or a small amount of distilled water.

It is noted that, in the present embodiment, the gas diffusion layer 14 is produced through the steps S1 to S3. However, the present invention is not limited thereto. For example, other job may be included as appropriate in between the steps.

Further, it has been described that, in step S3, the first diffusion layer 15 and the second diffusion layer 16 are stacked and bonded to each other by the flat press machine 33. However, the present invention is not limited thereto. For example, in step S3, the second diffusion layer 16 may be disposed between the first diffusion layer 15 and the mold 32, and bonding may be carried out by closing the molds 31 and 32 by the rolling machine. Specifically, in step S2, the molds 31 and 32 are closed and rolling is carried out by the rolling machine, to obtain the first diffusion layer 15. Subsequently, in step S3, the second diffusion layer 16 is disposed between the main surface of the first diffusion layer 15, which is opposite to the surface provided with the gas flow passages, and the mold 32. Then, the first diffusion layer 15 and the second diffusion layer 16 are stacked, and bonding is carried out by closing the molds 31 and 32 by the rolling machine.

As described above, use of the molds 31 and 32 in bonding the first diffusion layer 15 and the second diffusion layer 16 makes it possible to eliminate the step of removing the first diffusion layer 15 from the mold 31 after step S2.

Figure 5:
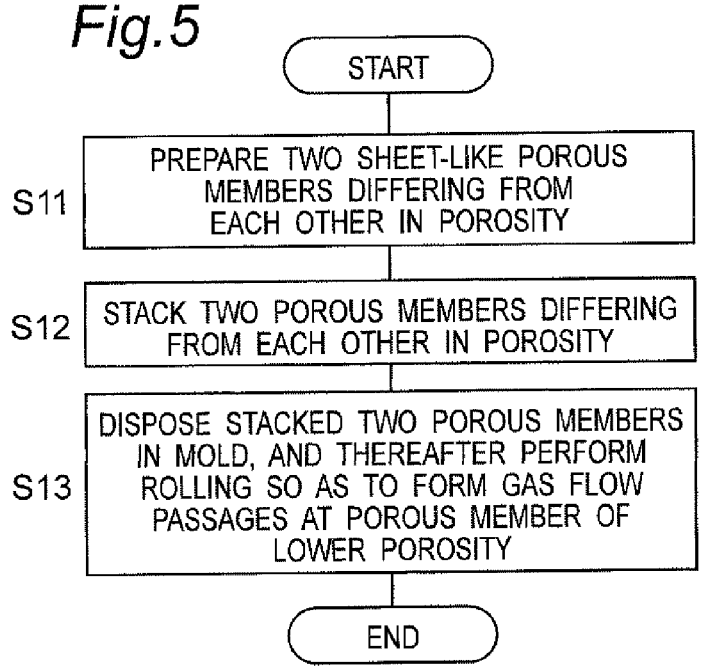
FIG. 5 is a flowchart showing another process for production of the gas diffusion layer according to the embodiment of the present invention.
Figure 6A:
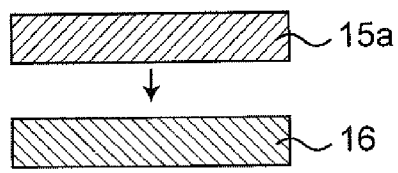
FIG. 6A is a schematic explanatory diagram showing another process for production of the gas diffusion layer according to the embodiment of the present invention.
Figure 6B:
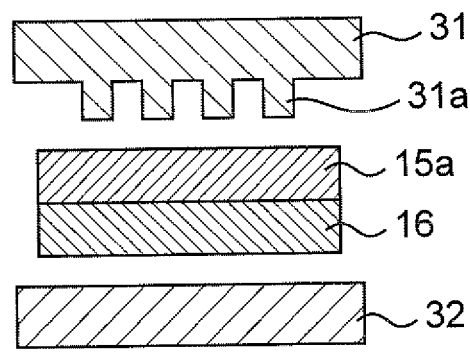
FIG. 6B is a schematic explanatory diagram showing a step following FIG. 6A.
Figure 6C:
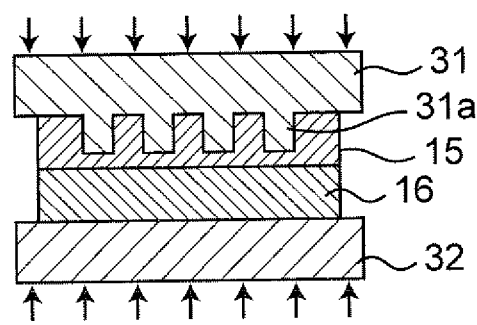
FIG. 6C is a schematic explanatory diagram showing a step following FIG. 6B.
Figure 8:
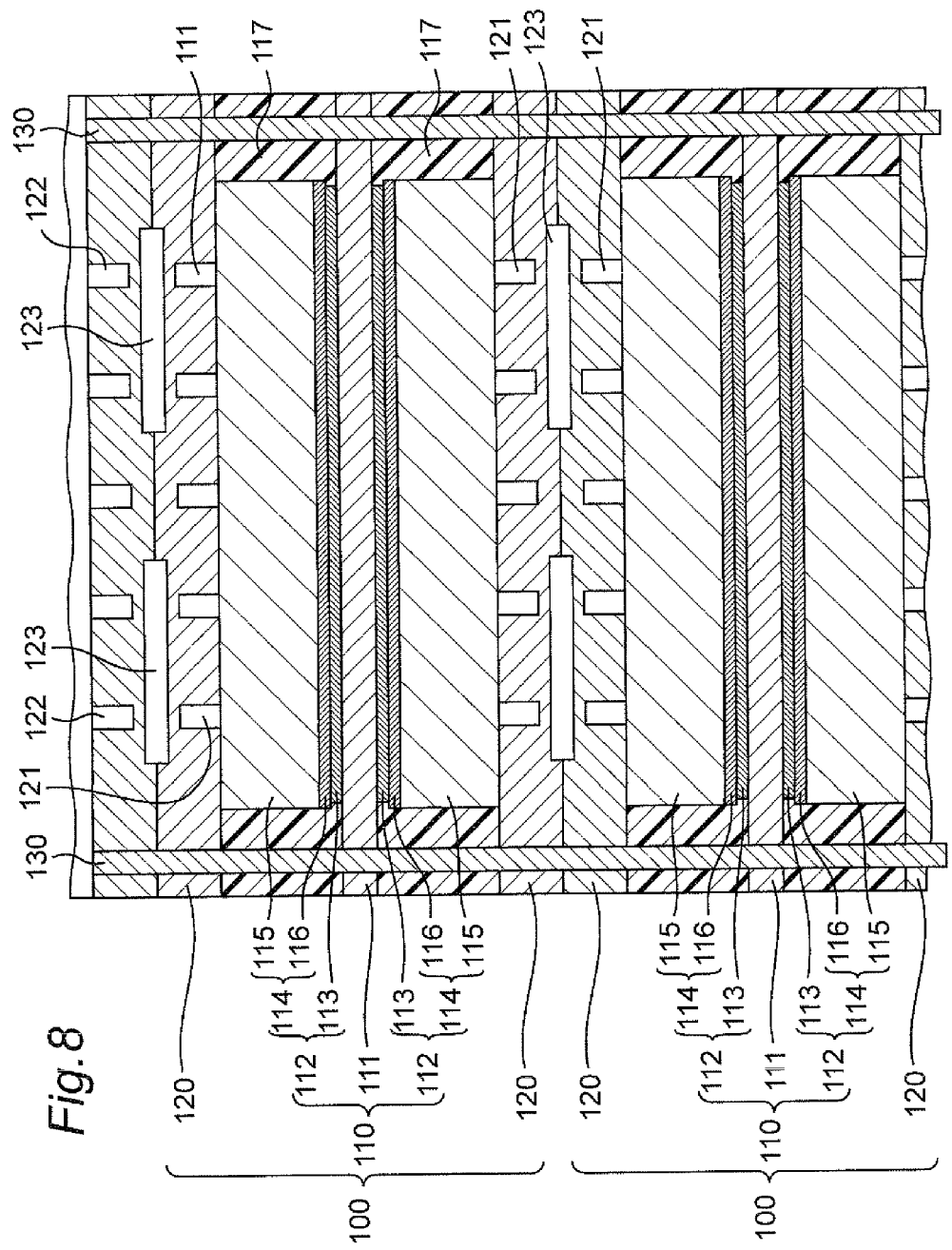
FIG. 8 is a schematic cross-sectional view showing the structure of a conventional fuel cell.

Further, another process for production of the gas diffusion layer 14 may be the method shown in FIG. 5 and FIGS. 6A to 6C. FIG. 5 is a flowchart showing another process for production of the gas diffusion layer. FIGS. 6A to 6C are each a schematic explanatory diagram thereof.

First, in step S11, similarly to step S1 described above, the two sheet-like porous members differing from each other in porosity are prepared.

Subsequently, in step S12, as shown in FIG. 6A, the porous member of a low porosity 15a and the second diffusion layer 16, which is the porous member of a high porosity, are stacked.

It is noted that, because the stacked product made up of the porous member of a low porosity 15a and the second diffusion layer 16 are pressurized in the following step S13, in step S12, what is required is to simply stack the porous member of a low porosity 15a and the second diffusion layer 16. Further, it goes without saying that the porous member of a low porosity 15a and the second diffusion layer 16 may previously be bonded to each other using the above-described flat plate press machine 33, the conductive adhesive, the dispersing solvent, the distilled water and the like.

Subsequently, in step S13, as shown in FIGS. 6B and 6C, the porous member of a low porosity 15a and the second diffusion layer 16 bonded to each other are disposed in the molds 31 and 32. At this time, the porous member of a low porosity 15a is disposed to face the mold 31 provided with the projection portions 31a. Thereafter, the porous member of a low porosity 15a and the second diffusion layer 16 disposed in the molds 31 and 32 is rolled by closing the molds 31 and 32 by the rolling machine. Thus, the gas diffusion layer 14 shown in FIG. 2 can be obtained. It is noted that, in a case where the gas diffusion layer 14 warps (i.e., is undulated) in the thickness direction, for example, the gas diffusion layer 14 should be pressurized at a surface pressure of 2 kg/cm$^2$ or less using the flat plate press machine 33.

As described above, in the fuel cell according to the embodiment of the present invention, the gas diffusion layer 14 has a two-layer structure made up of the first diffusion layer 15 and the second diffusion layer 16, and the first diffusion layer 15 provided with the gas flow passages 21 is set to be lower in porosity than the second diffusion layer 16. That is, the first diffusion layer 15 is set to be higher in strength than the second diffusion layer 16. Thus, it becomes possible to prevent the rib portions 22 each partitioning adjacent ones of the gas flow passages 21 from deforming under pressure applied when a plurality of cells 1 are stacked and fastened under pressure, which may otherwise invite blockage of the gas flow passages 21. Further, it becomes possible to prevent the reactant gas from permeating through the rib portions 22. Therefore, the reactant gas can flow at a constant flow rate in accordance with the shape of the gas flow passages 21, from the upstream portion to the downstream portion of the gas flow passages 21. Still further, because the second diffusion layer 16 is higher in porosity than the first diffusion layer 15, the gas diffusibility of the second diffusion layer 16 allows the reactant gas to diffuse vertically below the rib portions 22. This suppresses variations in the in-plane power generation distribution. Accordingly, the power generation performance can further be improved. Still further, because the first and second diffusion layers 15 and 16 are each structured with the porous member mainly comprised of conductive particles and the polymer resin, a reduction in costs can be achieved, and the gas flow passages of a complicated shape can be formed with ease.

It is noted that, in the present invention, the porosity can be measured as follows.

First, based on the true density of the materials structuring the gas diffusion layer and the composition ratio, the apparent density of the produced gas diffusion layer is calculated.

Subsequently, the weight, the thickness, and the longitudinal and lateral dimension of the produced gas diffusion layer are measured, to calculate the density of the produced gas diffusion layer.

Subsequently, into the following equation: porosity=(gas diffusion layer density)/(apparent density)×100, the calculated gas diffusion layer density and the apparent density are substituted, to calculate the porosity.

In the manner described above, the porosity of the produced gas diffusion layer can be measured.

It is noted that, the pore size distribution of the produced gas diffusion layer was measured using a mercury porosimeter, to verify that the porosity that can be calculated from the cumulative pore volume and the porosity calculated in the manner described above agree with each other.

It is noted that the present invention is not limited to the embodiment, and can be carried out in a variety of other modes. For example, in the foregoing description, the two-layer structure gas diffusion layer 14 of the present invention is disposed on each of the anode side and the cathode side. However, the present invention is not limited thereto. It is also possible to structure such that the two-layer structure gas diffusion layer 14 of the present invention is disposed on at least one of the anode side and the cathode side.

The oxidant gas flow passages of the cathode electrode (the air electrode) of a complicated shape as compared to the fuel gas flow passages of the anode electrode (fuel electrode) promotes an enhancement in power generation performance of the fuel cell. However, it is difficult to provide the gas flow passages of a complicated shape to a conventional separator structured with metal, or with carbon and resin. On the other hand, the first diffusion layer according to the present invention is structured with the base material-less gas diffusion layer and, therefore, the gas flow passage can easily be formed. Accordingly, for example, as shown in FIG. 7, it is also possible to dispose an anode gas diffusion layer 214A of a normal single-layer structure and a normal separator 220A provided with fuel gas flow passages 221A on the anode side, and to dispose the cathode gas diffusion layer 14C of the two-layer structure having the oxidant gas flow passages 21C and the collector plate 21C only on the cathode side. With such a structure also, a further improvement in power generation performance of the fuel cell can be achieved as compared to the conventional structure.

In this case, it is preferable that the anode gas diffusion layer 214A is lower in porosity than the second cathode gas diffusion layer 16C of the cathode gas diffusion layer 14C.

Thus, the water retentivity of the anode gas diffusion layer 214A can be raised higher than that of the second cathode gas diffusion layer 16C. Further, the gas diffusibility of the second cathode gas diffusion layer 16C can be raised higher than that of the anode gas diffusion layer 214A.

By properly combining arbitrary embodiments of the aforementioned various embodiments, the effects owned by each of them can be made effectual.

Industrial Applicability

In connection with the gas diffusion layer used for the fuel cell and the process for production thereof, and the fuel cell according to the present invention, the gas diffusion layer having gas flow passages formed on its one main surface makes it possible to achieve a further improvement in power generation performance. Therefore, the present invention is useful for a fuel cell used as, for example, a drive source of a mobile object such as an automobile, a distributed power generation system, a household cogeneration system and the like.

Although the present invention has been fully described in connection with the preferred embodiments thereof with reference to the accompanying drawings, it is noted that various changes and modifications are apparent to those skilled in the art. Such changes and modifications are to be understood as included within the scope of the present invention as defined by the appended claims unless they depart therefrom.

The disclosure of Japanese Patent Application No. 2009-209033 filed on Sep. 10, 2009, including specification, drawings, and claims is incorporated herein by reference in its entirety.

The invention claimed is:

1. A gas diffusion layer used for fuel cell, wherein
the gas diffusion layer has a double-layer structure made up of a first diffusion layer and a second diffusion layer, the first diffusion layer having a gas flow passage formed at one main surface of the first diffusion layer, and the second diffusion layer being stacked on an other main surface of the first diffusion layer,
the first and second diffusion layers are each structured with a porous member mainly comprised of conductive particles and a polymer resin, with carbon fibers added by a weight smaller than a weight of the polymer resin,
the first diffusion layer is lower in a porosity than the second diffusion layer, and
the first diffusion layer is higher in a composition ratio of the carbon fibers than the second diffusion layer.

2. The gas diffusion layer according to claim 1, wherein the carbon fibers are any one of vapor grown carbon fibers, milled fibers, and chopped fibers.

3. The gas diffusion layer according to claim 1, wherein the conductive particles contained in the first diffusion layer are structured with carbon materials of two types or more differing from each other in an average particle size.

4. The gas diffusion layer according to claim 1, wherein the first diffusion layer is lower in a composition ratio of the polymer resin than the second diffusion layer.

5. The gas diffusion layer according to claim 1, wherein the porosity of the first diffusion layer is 20% or more and less than 50%.

6. The gas diffusion layer according to claim 1, wherein the porosity of the second diffusion layer is 65% or more and less than 80%.

7. A fuel cell, comprising:
a polymer electrolyte membrane;
paired catalyst layers opposing to each other having the polymer electrolyte membrane interposed therebetween;

paired gas diffusion layers opposing to each other having the polymer electrolyte membrane and the paired catalyst layers interposed therebetween; and paired collector plates opposing to each other having the polymer electrolyte membrane, the paired catalyst layers, and the paired gas diffusion layers interposed therebetween, wherein at least one of the paired gas diffusion layers is the gas diffusion layer according to claim 1, and the first diffusion layer contacts the collector plate, and the second diffusion layer contacts the catalyst layer.

8. A fuel cell, comprising:

a polymer electrolyte membrane;

an anode catalyst layer formed on one main surface of the polymer electrolyte membrane;

an anode gas diffusion layer stacked on the anode catalyst layer;

a separator stacked on the anode gas diffusion layer, having a gas flow passage formed at a main surface of the separator that contacts the anode gas diffusion layer;

a cathode catalyst layer formed on an other main surface of the polymer electrolyte membrane;

a cathode gas diffusion layer stacked on the cathode catalyst layer; and a collector plate stacked on the cathode gas diffusion layer, wherein the cathode gas diffusion layer is the gas diffusion layer according to claim 1, and the first diffusion layer contacts the collector plate, and the second diffusion layer contacts the catalyst layer.

9. A process for production of a gas diffusion layer used for a fuel cell, comprising:

preparing two sheet-like porous members differing from each other in a porosity;

of the prepared two porous members, disposing a porous member whose porosity is lower in a mold having a projection portion corresponding to a shape of a gas flow passage, and thereafter, performing rolling so as to form the gas flow passage at one main surface of the porous member whose porosity is lower; and stacking and bonding a porous member whose porosity is higher on an other main surface of the porous member whose porosity is lower and having the gas flow passage formed, wherein each of the two porous members is a porous member mainly comprised of conductive particles and a polymer resin, with carbon fibers added by a weight smaller than a weight of the polymer resin, and the porous member whose porosity is lower, is higher in a composition ratio of the carbon fibers than the porous member whose porosity is higher.

10. A process for production of a gas diffusion layer used for a fuel cell, comprising:

preparing two sheet-like porous members differing from each other in a porosity;

stacking the prepared two porous members; and disposing the stacked two porous members in a mold having a projection portion corresponding to a shape of a gas flow passage, such that a porous member whose porosity is lower faces the projection portion, and thereafter, performing rolling so as to form the gas flow passage at one main surface of the porous member whose porosity is lower, wherein each of the two porous members is a porous member mainly comprised of conductive particles and a polymer resin, with carbon fibers added by a weight smaller than a weight of the polymer resin, and the porous member whose porosity is lower, is higher in a composition ratio of the carbon fibers than the porous member whose porosity is higher.

\* \* \* \* \*